(12) United States Patent
Darson Balleur et al.

(10) Patent No.: US 9,976,272 B2
(45) Date of Patent: May 22, 2018

(54) METHOD FOR MANUFACTURING AN ELEMENT IN THE GROUND BY IN-SITU SOIL MIXING WITH A GEOPOLYMER

(71) Applicant: SOLETANCHE FREYSSINET, Rueil Malmaison (FR)

(72) Inventors: Sabine Darson Balleur, Rueil Malmaison (FR); Fabrice Mathieu, Rueil Malmaison (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days. days.

(21) Appl. No.: 15/326,048

(22) PCT Filed: Jul. 15, 2015

(86) PCT No.: PCT/FR2015/051937
§ 371 (c)(1),
(2) Date: Jan. 13, 2017

(87) PCT Pub. No.: WO2016/009143
PCT Pub. Date: Jan. 21, 2016

(65) Prior Publication Data
US 2017/0204581 A1 Jul. 20, 2017

(30) Foreign Application Priority Data
Jul. 18, 2014 (FR) ..................................... 14 56978

(51) Int. Cl.
*E02D 3/12* (2006.01)
*E02D 17/13* (2006.01)

(52) U.S. Cl.
CPC ............. *E02D 3/126* (2013.01); *E02D 17/13* (2013.01); *E02D 2250/003* (2013.01); *E02D 2300/0018* (2013.01)

(58) Field of Classification Search
CPC ... E02D 3/126; E02D 17/13; E02D 2250/003; E02D 2300/0018; E02D 5/18; E02D 19/18; E02D 29/05; C04B 28/006; C04B 2111/00215; C04B 12/005; Y02P 40/165
USPC ....... 405/231, 232, 233, 235, 240, 241, 248, 405/266, 267, 269, 270
See application file for complete search history.

(56) References Cited

U.S. PATENT DOCUMENTS

| 6,470,607 B1 * | 10/2002 | Taki ........................ E02D 17/13 37/352 |
| 8,020,323 B2 * | 9/2011 | Chagnot ................... E02D 5/18 37/189 |
| 2009/0165338 A1 | 7/2009 | Chagnot et al. |
| 2012/0192765 A1 | 8/2012 | Huynh |

* cited by examiner

*Primary Examiner* — Carib A Oquendo
(74) *Attorney, Agent, or Firm* — MH2 Technology Law Group, LLP

(57) ABSTRACT

The invention relates to a method of fabricating an element in ground (S), the method comprising:
a step of drilling an excavation (T) in the ground; and
a step of mixing the ground in place in the excavation in situ with a geopolymer.

14 Claims, 4 Drawing Sheets

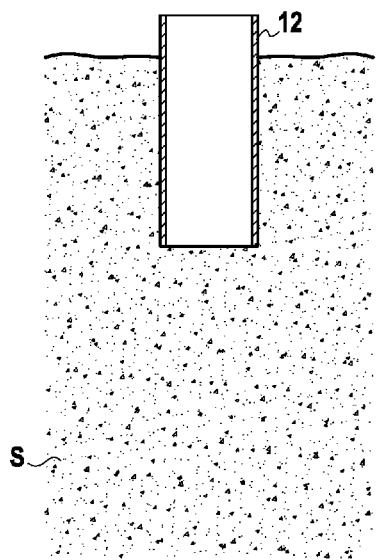
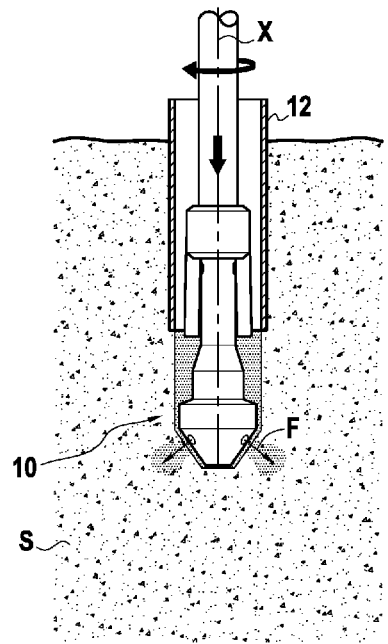
FIG.1A
FIG.1B
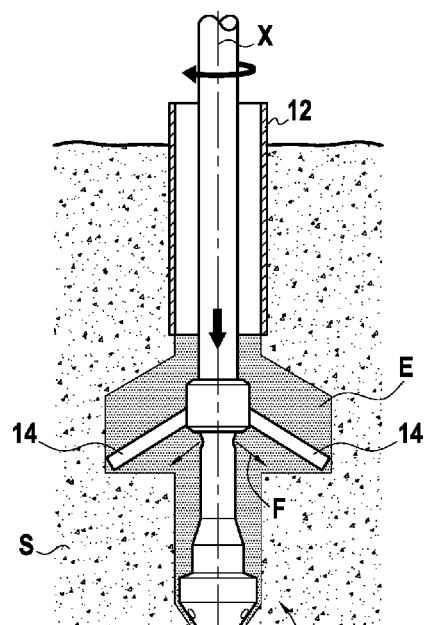
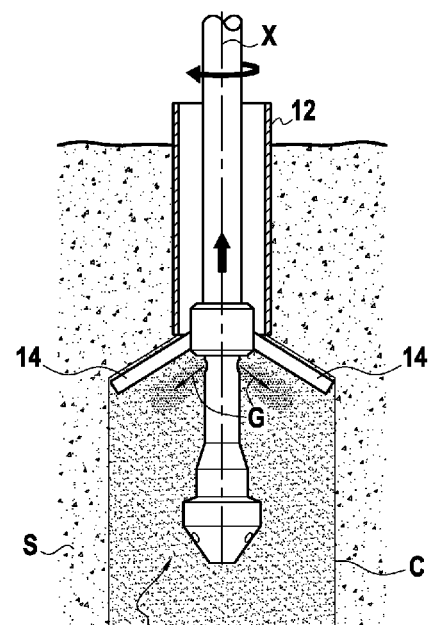
FIG.1C
FIG.1D

METHOD FOR MANUFACTURING AN ELEMENT IN THE GROUND BY IN-SITU SOIL MIXING WITH A GEOPOLYMER

BACKGROUND OF THE DISCLOSURE

The present disclosure relates to the technical field of fabricating in situ elements constituted by mixing the ground in place with an additional material. Such a technique is commonly referred to as deep soil mixing.

The disclosure relates more particularly to a method of fabricating an element in ground by a deep soil mixing technique.

In this method, the additional material is usually a hydraulic binder that generally contains Portland type cement. On being mixed with the ground, a material is obtained that provides specific mechanical properties.

Nevertheless, that technique suffers from several drawbacks. Firstly, the resulting material presents poor durability: it tends to become degraded after prolonged exposure to air and outdoor weather conditions, or indeed as a result of prolonged exposure to certain pollutants in the ground. For example when ground polluted by the presence of sulfates is used for fabricating the element, swelling phenomena are observed to appear.

Finally, that type of hydraulic binder containing Portland cement is known to present a poor carbon footprint.

OBJECT AND SUMMARY OF THE DISCLOSURE

An object of the present disclosure is to remedy the above-mentioned drawbacks by proposing a method making it possible by using a deep soil mixing technique to fabricate an element in ground that presents better durability and a better carbon footprint than prior art elements.

To do this, the disclosure provides a method of fabricating an element in ground, the method comprising:
  a step of drilling an excavation in the ground; and
  a step of mixing the ground in place in the excavation in situ with a geopolymer.

The shape of the excavation depends on the drilling tool used. It may be a trench or an elongate borehole, depending on the shape of the element that is to be fabricated.

It can thus be understood that the ground of the excavation is destructured during the drilling step, and is mixed with the geopolymer in order to form the material constituting the element. The element is obtained as a result of the material setting.

The geopolymer, also known as a geopolymer cement, is generally the result of mixing a silico-aluminous mineral with an alkaline reagent.

Geopolymer cement is known to present a carbon footprint that is much smaller than that of Portland cement. In addition, it is not very corrosive. In this context, WO 2011/020975 provides an example of a non-corrosive geopolymer cement.

The element that is obtained after settling of the material that results from mixing the ground in place with the geopolymer thus presents better ability to withstand chemical attack from the ground, thereby giving it greater durability.

The method of the disclosure thus makes it possible in particular to fabricate diaphragms, screens, or columns in the ground that present better durability, which presents an advantage, given that retaining works are generally expected to last a long time.

The method of the disclosure thus finds applications in particular:
  in constructing elements in the form of unitary ground inclusions of any section (rectangular, circular, square, or other) in the presence or absence of a water table;
  in the construction of elements in the form of ground inclusions of linear shape, in the form of a continuous screen, or in the form of a succession of unitary elements adjacent to one another;
  in the construction of screens of low permeability; and
  in the construction of temporary or permanent retaining screens. In a variant, the method also includes a step of inserting a stiffener member in the excavation, such as for example a reinforcing cage, prior to the geopolymer setting.

In a first implementation, the method of the disclosure includes a step of injecting a composition containing a geopolymer into the excavation such that during the mixing step the composition is mixed with the ground in situ.

Thus, in this first implementation, the composition containing the geopolymer is injected into the excavation in order to be mixed in situ with the excavated ground.

The geopolymer may be prepared on the surface, e.g. in the form of a slurry or a mortar, prior to being injected into the excavation, in the vicinity of the drilling and mixing tool.

In a second implementation, an alkaline base is injected into the excavation in order to form the geopolymer in situ by reaction of the alkaline base with the ground in place.

The alkaline base then reacts with the silico-aluminous mineral that is naturally present in the ground. It can thus be understood that the geopolymer is synthesized in situ in the excavation, during mixing with the ground in place.

In a third implementation, a drilling and mixing tool is provided and the method comprises a stage of lowering the drilling and mixing tool followed by a stage of raising the drilling and mixing tool, the method including a step of injecting a first composition during the lowering stage, and a step of injecting a second composition during the raising stage, the drilling step taking place during the lowering stage, the mixing step including a first stage of in situ mixing of the ground in place with the first composition during the lowering stage, followed by a second stage of in situ mixing of the second composition with the ground in place as previously mixed with the first composition, the second mixing stage taking place during the raising stage, the geopolymer being formed in situ by reaction of the first composition with the second composition.

Thus, the geopolymer is formed during the stage of raising the drilling and mixing tool, while being mixed with the excavated ground in order to form the material constituting the element.

This third implementation presents several advantages. Firstly, it makes it possible to control the setting of the geopolymer. It can be understood that the method makes it possible to activate in deferred manner the setting of the material constituted by mixing geopolymer and the excavated ground, with setting taking place after the lowering stage, and according to some embodiments, after the raising stage.

It thus makes it possible to avoid the geopolymer setting during the lowering stage, which would run the risk of making it difficult to raise the tool, in particular when drilling to great depth.

Another advantage is that it also makes it possible to fabricate the element at two different times, it being possible for the raising stage to take place several hours or days after the lowering stage.

The first composition may contain a silico-aluminous mineral while the second composition contains an alkaline base, or else, in a variant, the first composition contains an alkaline base while the second composition contains a silico-aluminous mineral.

The first composition that is injected during the first mixing stage may be a liquid containing particles of aluminous silica, while the second composition that is injected during the second mixing stage is alkaline silicate in liquid form.

In a variant, the first and second compositions, both in liquid form, are injected at high pressure, e.g. at a pressure higher than 5 megapascals (MPa).

The first and/or second composition may also be injected into the ground in powder form. Under such circumstances, water is injected, if necessary.

For performing this third implementation, it is possible by way of example to make use of the drilling and mixing tools described in Documents WO 2007/116178 and EP 1 878 833, or any other drilling and mixing tool.

In a fourth implementation, prior to the drilling step, a pretrench is formed in the ground, and the pretrench is filled with a first composition, in which method there is subsequently performed a step of injecting a second composition into the excavation during the drilling step, and in which:

the drilling step consists in drilling a trench in register with the pretrench containing the first composition in order to entrain the first composition into the excavation; and the mixing step consists in mixing the ground in place with the first and second compositions;

the geopolymer being formed in situ by the first composition reacting with the second composition.

Thus, during the drilling step, the first composition contained in the pretrench is taken into the excavation in order to be mixed therein during the mixing step with the ground in place and with the first and second compositions, so as to form the material constituting the element, i.e. a material that results from mixing the ground in place with a geopolymer obtained by reacting together the first and second compositions.

The first composition may contain a silico-aluminous mineral while the second composition contains an alkaline base, or indeed in a variant, the first composition contains an alkaline base while the second composition contains a silico-aluminous mineral.

The first composition, which has spread in the pretrench, may be a silico-aluminous mineral, while the second composition is a liquid solution of alkaline silicate.

In order to perform this fourth implementation, it is possible to use a continuous drilling and mixing tool, of the trencher type, provided with a vertical blade. The second composition may be injected into the excavation via nozzles arranged along the blade.

Finally, the disclosure provides an element in ground obtained by performing the method according to any of the preceding claims, the element being constituted by ground in place mixed with a composition containing a geopolymer.

Said element may be a retaining element.

BRIEF DESCRIPTION OF THE DRAWINGS

The disclosure can be better understood on reading the following detailed description given by way of non-limiting indication and with reference to the accompanying drawings, in which:

FIGS. 1A to 1D show a first implementation of the disclosure;

DETAILED DESCRIPTION OF THE DISCLOSURE

With reference to FIGS. 1A to 4C, there follow, by way of non-limiting example, successive descriptions of four implementations of the method of the present disclosure.

The first implementation is described with reference to FIGS. 1A to 1D.

In this example, the first implementation makes use of a drilling and mixing tool as described in Document EP 1 878 833.

Naturally, other drilling and mixing tools could be used in the context of this first implementation, such as for example the tool described in Document WO 2007/116178, or indeed single or double vertical augers.

In this example, an element is fabricated in ground S, which element is in the form of a column C. To do this, there is an initial step of drilling an excavation E in the ground S, by introducing a drilling and mixing tool 10 into the ground S, which tool is rotary about a vertical axis X. As can be seen in FIGS. 1A to 1D, the drilling and mixing tool 10 passes through a tubular portion 12 previously inserted in the ground S for drilling. This step of prior insertion of the tubular portion 12 is nevertheless optional.

The drilling operation in this example is performed by setting the tool 10 into rotation while injecting a drilling fluid F.

As can be seen in FIG. 1C, after the drilling and mixing tool 10 has gone past the tubular portion 12, two fins 14 become deployed radially in order to increase the diameter of the excavation.

After the drilling and mixing tool 10 has reached the desired drilling depth, the tool is raised. During this raising stage, the drilling and mixing tool 10 continues to rotate about the vertical axis of rotation X, and a composition G containing a geopolymer is injected into the excavation so that, during the raising stage, a mixing step is performed in which the composition G containing the geopolymer is mixed in situ with the excavated ground.

In this example, the composition G is an amorphous silica gel obtained by the action of an alkaline silicate (soda, potash, or other) on a silico aluminous mineral (e.g. ash, slag, metakaolin). The column C constituted by mixing excavated ground with the geopolymer G presents low porosity and good resistance to chemical attack.

It has also been found that gel formation is considerably faster than the process of hydrating cement. Finally, once the gel has been formed by precipitation and mixing with the excavated ground, its strength no longer varies as a function of time.

It can thus be understood that this gel G is prepared on the surface is and injected into the excavation during the stage of raising the drilling and mixing tool 10, while being mixed in situ with the ground.

After setting, a column is obtained that is constituted by a material presenting better durability than columns made using a hydraulic binder constituted by a mixture of bentonite and cement.

Figure 2A:
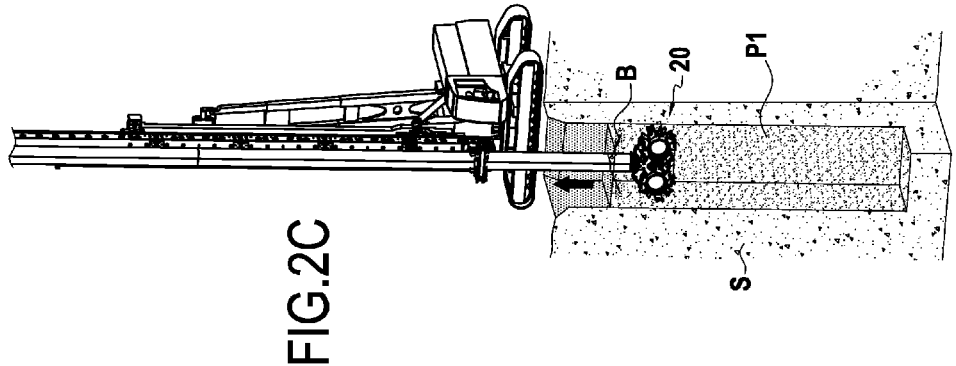
FIGS. 2A to 2C show a second implementation of the disclosure.
Figure 2B:
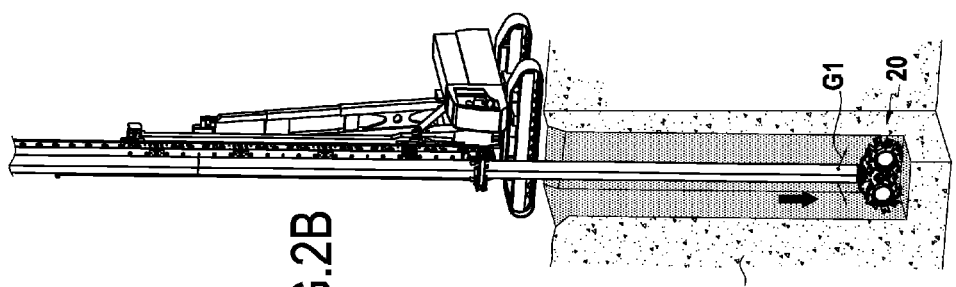
Figure 2C:
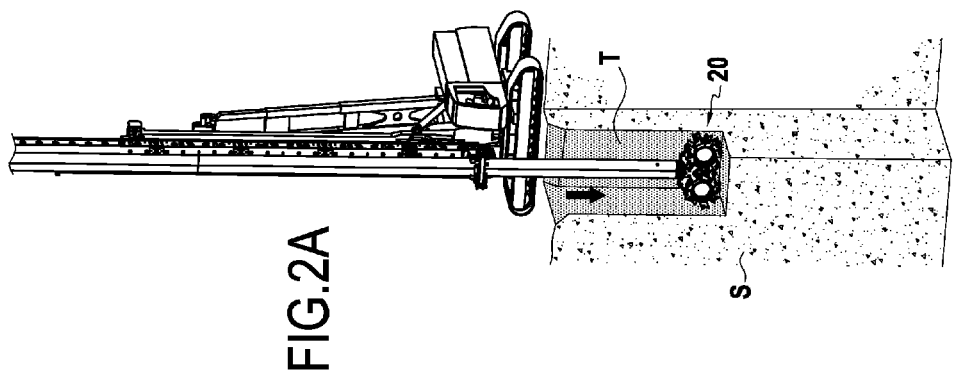

With reference to FIGS. 2A to 2C, there follows a description of a second implementation of the method of the disclosure. In this example, a drilling and mixing tool 20 is used that has two drilling and mixing drums that are rotary about horizontal axes. Reference may be made to Document WO 2007/116178 for a more detailed description of this tool.

In this implementation, and as shown in FIG. 2A, a step is performed of drilling and excavating a trench T in the ground S by lowering the above-mentioned tool 20. Once the tool has reached the desired drilling depth, it is raised. During this raising stage, an alkaline base B is injected into the trench while continuing to cause the drilling and mixing drums to rotate so as to form the geopolymer in situ in the trench by reaction between the alkaline base and the silico-aluminous mineral contained in the ground in place. As an alkaline base, it is possible by way of example to use potassium silicate or sodium silicate.

Figure 3A:
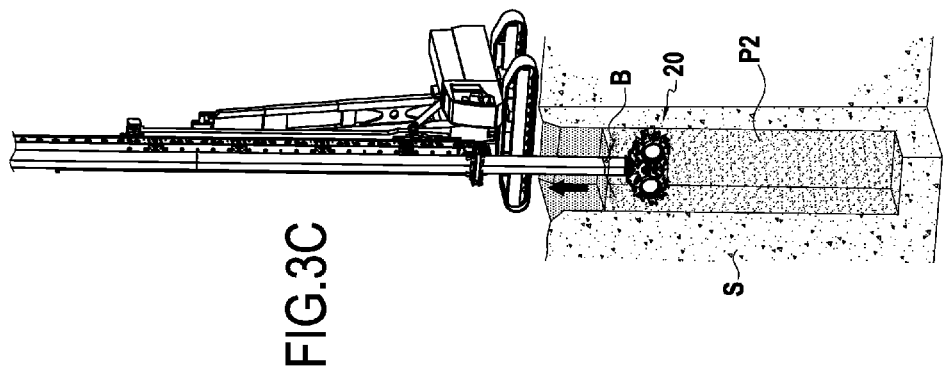
FIGS. 3A to 3C show a third implementation of the disclosure.
Figure 3B:
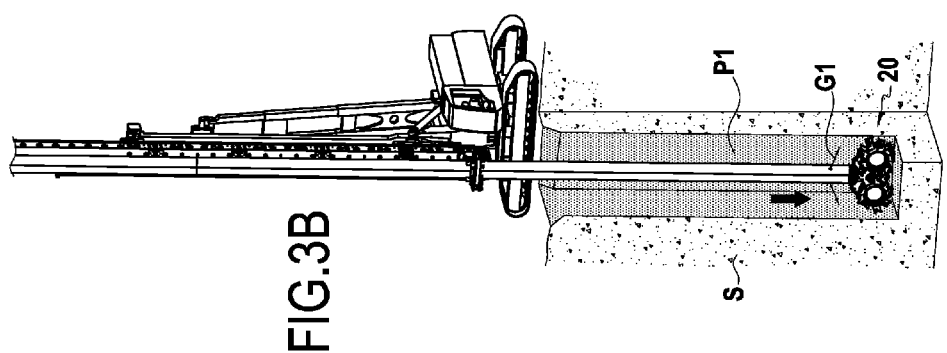
Figure 3C:
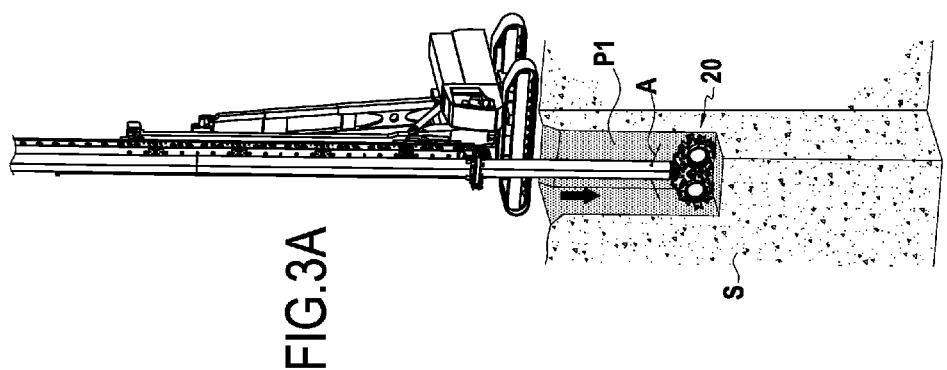

With reference to FIGS. 3A to 3C, there follows a description of a third implementation of the method of the disclosure.

In this implementation, a drilling and mixing tool 20 is provided that is similar to that shown in FIGS. 2A to 2C.

A drilling step is performed that takes place during a stage of lowering the drilling and mixing tool, as shown in FIG. 3A.

According to the disclosure, a step is performed of injecting a first composition A during the lowering stage while performing in situ a first stage of mixing the ground in place with the first composition A.

Thus, during this lowering stage, the trench T is drilled while performing in situ mixing of the ground in place with the first composition A.

Once the drilling and mixing tool 20 has reached the desired depth, as shown in FIG. 3B, the drilling and mixing tool is raised.

During this raising stage, a second composition B is injected into the ground and a second stage of in situ mixing is performed between the second composition B and the ground in place that has previously been mixed with the first composition A. The second mixing stage thus takes place during the stage of raising the drilling and mixing tool.

The geopolymer G is formed in situ by reaction of the first composition A with the second composition B in compliance with the following formula:

In this example, the first composition A that is injected during lowering comprises 700 kilograms (kg) of fly ash. A liquid is also injected in the form of a mixture of water and bentonite (20 kg to 30 kg).

During the raising stage, the mixture of ground and first composition A that was previously made during the lowering stage continues to be mixed, while injecting the second composition B in the form of a mixture of water, soda, and silicate (e.g. 300 liters (L) of water, 115 kg of soda, and 310 kg of silicate).

After the material that results from mixing the excavated ground and the geopolymer G has set, a molded diaphragm P2 is obtained in the ground S.

As can be understood, this third implementation can alternatively be performed using the tool shown in FIGS. 1A to 1D.

Figure 4A:
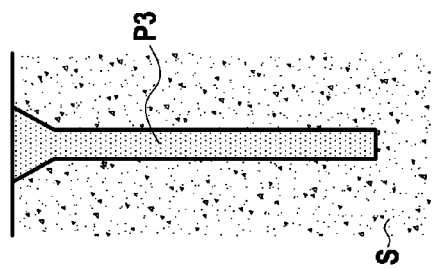
FIGS. 4A to 4C show a fourth implementation of the disclosure.
Figure 4B:
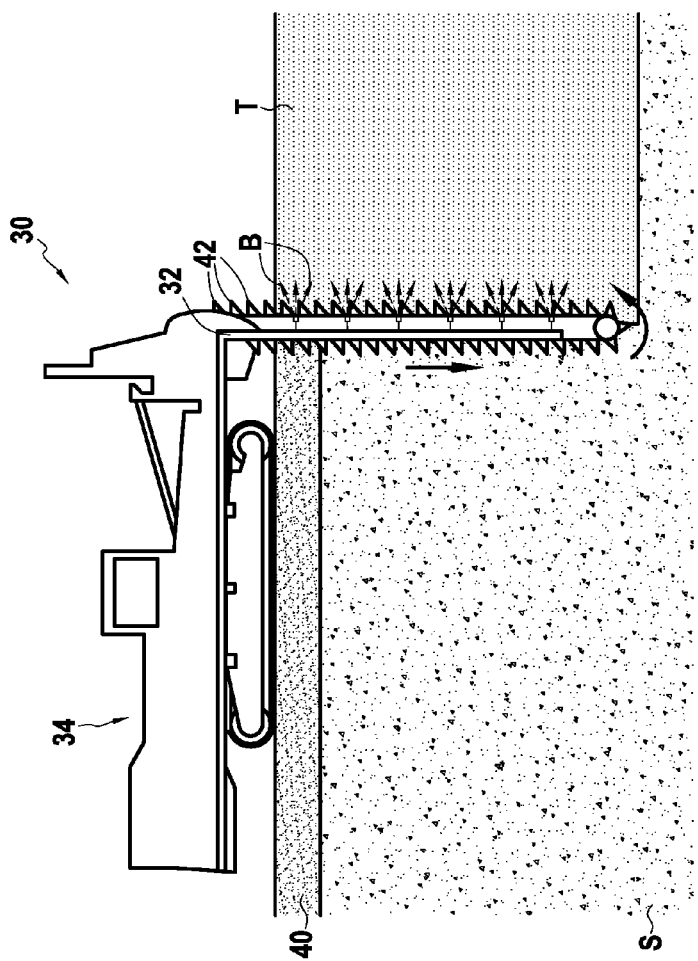
Figure 4C:
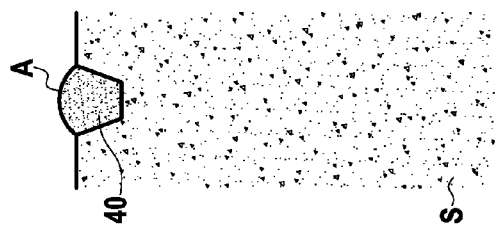

With reference to FIGS. 4A to 4C, there follows a description of a fourth implementation of the method of the disclosure.

A drilling and mixing tool 30 is provided, namely a trencher having a blade 32 that extends vertically; the blade 32 is connected to a carrier 34. Moving the carrier 34 enables an excavation to be made in the form of a continuous trench T. Such a drilling and mixing tool 30 is well known from elsewhere and is not described in greater detail herein.

In the method, a pretrench 40 is formed initially in the ground S and filled with a first composition A. In this example, it is a silico-aluminous mineral. The depth of this pretrench is of the order of 20 centimeters (cm) to 1 meter (m).

Thereafter, a drilling step is performed that consists in drilling a trench T through the pretrench 40 that contains the first composition A, so as to entrain the first composition A into the excavation. At the same time as the drilling step, a second composition B is injected into the trench and the ground in place is mixed in situ with the first and second compositions A and B in order to form the material constituting the element that is to be fabricated, namely a continuous diaphragm P3.

In this example, the second composition is a liquid alkaline silicate solution that is pumped into the trench via nozzles 42 arranged along the blade 32. The reaction between the first and second compositions A and B forms a geopolymer in situ that is simultaneously mixed with the ground in place. After setting, a continuous diaphragm P3 is obtained.

The invention claimed is:

1. A method of fabricating an element in ground, the method comprising:
   a step of drilling an excavation in the ground; and
   a step of in situ mixing the ground in place in the excavation with a composition containing at least one alkaline base in order to form a geopolymer in situ.

2. The method according to claim 1, wherein the composition containing the alkaline base is injected into the excavation in order to form the geopolymer in situ in the excavation by reaction of the alkaline base with the ground in place.

3. The method according to claim 1, wherein:
   a drilling and mixing tool is provided, and
   the drilling step comprises a stage of lowering the drilling and mixing tool followed by a stage of raising the drilling and mixing tool,
   the method further includes:
      a step of injecting a first composition during the lowering stage, and
      a step of injecting a second composition during the raising stage,
   the drilling step takes place during the lowering stage,
   the mixing step comprises:
      a first stage of in situ mixing of the ground in place with the first composition during the lowering stage, and followed by a second stage of in situ mixing of the second composition with the ground in place as previously mixed with the first composition, the second mixing stage taking place during the raising stage, and
   the geopolymer is formed in situ by reaction of the first composition with the second composition, the first composition or the second composition containing the alkaline base.

4. The method according to claim 3, wherein:
   the first composition contains a silico-aluminous mineral while the second composition contains the alkaline base; and
   when the first composition contains the alkaline base, the second composition contains a silico-aluminous mineral.

5. The method according to claim 4, wherein the alkaline base contains a solution of alkaline silicate.

6. The method according to claim 1, wherein:
prior to the drilling, the method further comprises forming a pretrench is formed in the ground, and the filling the pretrench with a first composition,
during the drilling, the method further comprises injecting a second composition into the excavation,
the excavation is in the form of a trench in register with the pretrench containing the first composition in order to entrain the first composition into the excavation;
the mixing step comprises mixing the ground in place with the first and second compositions;
the geopolymer is formed in situ by the first composition reacting with the second composition; and
the first composition or the second composition contains the alkaline base.

7. The method according to claim 6, wherein:
the first composition contains a silico-aluminous mineral while the second composition contains the alkaline base; and
when the first composition contains the alkaline base, the second composition contains a silico-aluminous mineral.

8. The method according to claim 7, wherein the alkaline base contains a solution of alkaline silicate.

9. An element in ground obtained by performing a method according to claim 1, said element being constituted by the ground in place mixed in situ with at least one composition containing an alkaline base.

10. The element according to claim 9, wherein said element is constituted by the ground in place mixed in situ with a first composition containing an alkaline base and a second composition containing a silico-aluminous mineral.

11. A method of fabricating an element in ground, the method comprising:
drilling an excavation in the ground; and
forming a geopolymer in situ by mixing the ground in the excavation with a composition containing at least one alkaline,
wherein the composition is configured to form the geopolymer by a reacting with silico-aluminous mineral in the ground.

12. The method of claim 11, wherein:
the drilling of the excavation comprises:
lowering a drilling and mixing tool into the ground while drilling the excavation; and
raising the drilling and mixing tool from the excavation; and
the method further comprises:
injecting a first composition containing the alkaline base during the lowering, and
injecting a second composition the alkaline base during the raising,
the mixing comprises:
during the lowering, forming a first mixture by in situ mixing of the ground with the first composition, and
during the raising, forming a second mixture by in situ mixing of the second composition with the first composition, and
the first composition and the second composition are configured to form the geopolymer.

13. The method of claim 11, further comprising:
prior to the drilling of the excavation, forming a pretrench in the ground; and
filling the pretrench with a first composition, and
during the drilling of the excavation, injecting a second composition into the excavation,
wherein:
the drilling of the excavation comprise forming a trench in register with the pretrench such that the first composition is entrained into the excavation; and
the mixing comprises mixing the ground in place with the first and second compositions;
the first composition and the second composition are configured to form the geopolymer; and
the first composition and the second composition contain the alkaline base.

14. A method of fabricating an element in ground, the method comprising:
forming a pretrench in the ground;
filling the pretrench with a first composition,
drilling an excavation in the ground in register with the pretrench, the drilling including injecting a second composition into the excavation; and
forming a geopolymer in situ by mixing the ground in the excavation with a composition containing at least one alkaline,
wherein the mixing comprises mixing the ground in place with the first and second compositions.

* * * * *